United States Patent Office 3,358,017
Patented Dec. 12, 1967

3,358,017
PROCESS FOR PRODUCING SUBSTANTIALLY
ODORLESS ALKARYL SULFONATES AND
THE COMPOSITION OBTAINED THEREBY
Wolfgang K. Seifert, Fairfax, Calif., assignor to Chevron Research Company, a corporation of Delaware
No Drawing. Filed Aug. 27, 1964, Ser. No. 392,598
9 Claims. (Cl. 260—505)

ABSTRACT OF THE DISCLOSURE

The process for the production of a substantially odorless alkylaryl sulfonate detergent product containing 9 to 18 carbon atoms in the alkyl component by neutralizing the alkylaryl sulfonic acid mixtures to a pH of at least 7, and incorporating into the neutralizing mixture 0.0001 to 0.1% by weight based on alkylaryl sulfonate of an alkali metal borohydride, and preferably sodium borohydride, and including compositions obtained thereby.

---

This invention relates to a process for producing odorless alkylaryl sulfonate detergents and to odorless alkylaryl sulfonate detergent compositions prepared in accordance therewith.

In the preparation of alkylaryl sulfonate detergents of the type herein contemplated, alkylaryl hydrocarbon containing 9 to 18 carbon atoms in the alkyl groups are sulfonated with concentrated sulfuric acid to produce a mixture comprising alkylaryl sulfonic acids and unreacted sulfuric acid. The mixture is digested and then is neutralized as such ("whole acid"). Often in practice the mixture after digestion is settled or is otherwise treated to effect a separation of an alkylaryl sulfonic acid phase from an aqueous sulfuric acid phase. To aid settling, there is often added sufficient water to reduce the sulfuric acid strength, e.g., to 78–80%. The sulfonic acid phase is then neutralized as before with a base to give the salt of the sulfonic acid, and inorganic sulfate due to the presence of sulfuric acid. As bases there may be mentioned sodium hydroxide, potassium hydroxide, ammonium hydroxide, and magnesium hydroxide.

As is known in the art, the sulfonation process can be continuous or batch or a combination thereof.

It is known that in the manufacture of alkylaryl sulfonates as thus described the sulfonation and neutralization steps gives rise to a product possessing a characteristic undesirable odor. It has accordingly been proposed to solve the odor problem by a treatment involving the use of a quinone or an aromatic amine, as shown in U.S. Patents 2,831,021 and 2,757,195, respectively.

Also known is the fact that upon storage alkylaryl sulfonates develop a rancid odor which according to the prior art is overcome by various means, as shown, for example, in U.S. Patents Nos. 2,469,378, 2,397,133, and 2,469,376.

In accordance with the present invention, it is proposed to overcome the undesirable odor due to rancidity and that resulting from the sulfonation and neutralization steps by incorporating in the neutralized product a small but effective amount of alkali metal borohydride, for example, 0.0001 to 0.1%, by weight, based on alkylaryl sulfonate. Sodium borohydride is preferred, although other alkali metal borohydrides, such as lithium and potassium are operative.

Since the presence of acid destroys alkali metal borohydrides, care is taken that the salt is added to the neutralized sulfonic acid mixture at a pH of at least 7.

The incorporation of borohydride can be effected in a number of ways. The sulfonic acid phase can be neutralized to a pH of 7, whereupon the borohydride salt may be added along with additional base or as a separate charge as the addition of base is continued to the desired extent, e.g., to a pH of 8 or 9. On the other hand, neutralization can first be effected to a higher pH, e.g., 9 or 10, after which the borohydride salt can be added.

Good results are obtained if the borohydride salt is allowed to contact the neutralized sulfonic-sulfuric acid phase at room temperature (about 80° F.) for a period of time sufficient to remove odor, generally about 1 hour to 60 hours. Odor removal is expedited by effecting intimate contact, as by stirring, and by the use of somewhat elevated temperatures, for example, up to about 120° F.

The effectiveness of the borohydride salt can also be enhanced by the use of a solvent for it, such as ethyl alcohol. This feature is particularly useful in the preparation of liquid detergents.

In a more specific embodiment of the invention, there is incorporated in the sulfonic acid-alkali metal borohydride mixture a second additive. The second additive is a dienophile, that is, a material capable of undergoing a Diels-Alder reaction with conjugated dienes. An example of such reagent is ethyl azodicarboxylate. An amount of this material ranging from about 0.04 to 2% by weight based on alkylaryl sulfonate detergent is cited as satisfactory. Reaction proceeds satisfactorily at room temperature, i.e., about 80° F.

The following examples illustrate the practice of the invention.

EXAMPLE 1

Polypropylene alkylbenzenes having an average molecular weight of 265 were continuously sulfonated with 20% oleum in a weight ratio of the oleum to the alkylbenzene of 1.15 at a temperature of 120° F. The resulting sulfonation mixture was digested for 12 minutes at 120° F. Water was added to the digested mixture to reduce sulfuric acid strength of 78–80%, and the mixture then settled for 20 minutes at 130° F. to separate an alkylbenzene sulfonic acid layer and a sulfuric acid layer. The sulfonic acid layer was neutralized with a solution of sodium hydroxide to give a slurry having a pH of 7 and a surface-active material content of 40% by weight. The slurry had the typical undesirable sludge color.

The sulfonate slurry, 450 g., was mixed with 150 g. of 95% ethanol and 600 g. of water to give a liquid detergent solution of about 18% active composition.

(a) To a sample of 100 g. of the above liquid detergent there was added 0.05 ml. of a freshly prepared alcoholic solution of sodium borohydride (0.20 g. per 100 ml. of 95% ethanol).

(b) To a second sample 100 g. of the above liquid detergent there was added 0.5 ml. of the same alcoholic solution of sodium borohydride.

The two samples, plus a blank sample of 100 g., were each stirred briefly and then allowed to stand for 15 hours. At the end of this time, odor tests showed that samples (a) and (b) had a significant decrease in odor as compared with the blank.

EXAMPLE 2

Straight-chain alkylbenzene was prepared from a mixture of n-paraffins having from 11 to 14 carbon atoms by batch sulfonating them at a temperature of 45–60° F. with 22% oleum, the weight ratio of the oleum to alkylbenzenes being 1.11. The sulfonation mixture was digested at 120° F. for 1 hour, after which the mixture, water being added to aid in phase separation, was allowed to settle for 1 hour at 150° F. The alkylbenzene sulfonic acid layer was neutralized with sodium hydroxide solution and then dried. The dried material was maintained in air at 160° F. for 1 week in order to develop a strong, rancid odor. At the end of this time a liquid detergent was formulated from this dried material, ethanol and water. The final analysis was 1.5 surface-active compounds in a 15% alcohol solution in water. The pH was 7.

(a) To 100 g. of this liquid detergent there was added 0.1 ml. of a freshly prepared alcoholic solution of sodium borohydride (0.20 g. per 100 ml. of 95% ethanol).

(b) To 100 g. of this liquid detergent there was added 1 ml. of a freshly prepared alcoholic solution of sodium borohydride (0.20 g. per 100 ml. of 95% ethanol).

(c) To 100 g. of this liquid detergent there was added 10 ml. of a freshly prepared alcoholic solution of sodium borohydride (0.20 per 100 ml. of 95% ethanol).

The solutions were stirred briefly and allowed to stand at 80° F. for 16 hours. At the end of this time the pH was adjusted to 7, and the odor of each treated sample was noted. A significant improvement in odor was found for samples (b) and (c), and a noticeable improvement was found for sample (a).

EXAMPLE 3

A mildly malodorous material was prepared by adding 1.6 g. of the rancid material of Example 2 to a 1000 g. of a freshly prepared straight-chain sodium alkylbenzene sulfonate detergent prepared as in Example 2. The resulting mixture was diluted with water to form a slurry containing 17% surface-active material.

(a) To 100 g. of this slurry there was added 0.01 ml. of freshly prepared alcoholic borohydride solution (0.2 g. of sodium borohydride dissolved in 100 mls. of 95% ethanol).

(b) To a second 100 g. sample of the slurry there was added 0.1 ml. of the same alcoholic solution.

Both samples were stirred briefly and allowed to stand for 5 hours. At the end of this time, a noted improvement in both samples was noted.

I claim:

1. In a process for producing alkylaryl sulfonate by sulfonating an alkylaryl hydrocarbon having 9 to 18 carbon atoms in the alkyl groups with concentrated sulfuric acid to produce an alkylaryl sulfonic acid mixture and neutralizing said mixture, the improvement of producing a substantially odorless alkylaryl sulfonate detergent product which comprises neutralizing the alkylaryl sulfonic acid mixture to a pH of at least 7 and then incorporating into the neutralized mixture about 0.0001 to 0.1% by weight based on alkylaryl sulfonate of an alkali metal borohydride.

2. Process according to claim 1 wherein the alkylaryl hydrocarbon is an alkylbenzene, the alkali metal borohydride is present in an amount of about 0.0001 to 0.1%, by weight, based on neutralized alkylaryl sulfonate detergent.

3. Process according to claim 1 wherein the alkali metal borohydride is incorporated in the neutralized alkylaryl sulfonate detergent in the presence of a solvent therefor.

4. Process according to claim 1 wherein the alkali metal borohydride is sodium borohydride.

5. Process of producing an odorless alkylaryl sulfonate detergent which comprises sulfonating an alkylaryl hydrocarbon having 9 to 18 carbon atoms in the alkyl groups with concentrated sulfuric acid to produce a reaction product mixture comprising alkylaryl sulfonic acids and unreacted sulfuric acid, separating said reaction product mixture into an alkylaryl sulfonic acid phase and a sulfuric acid phase, neutralizing the alkylaryl sulfonic acid phase to a pH of at least 7, adding to the neutralized mixture 0.0001 to 0.1% by weight based on alkylaryl sulfonate of alkali metal borohydride to remove undesirable odor.

6. Process according to claim 5 wherein the alkylaryl hydrocarbon is an alkylbenzene the alkali metal borohydride is added in an amount of about 0.0001 to 0.1%, by weight, based on neutralized alkylaryl sulfonate detergent.

7. Process according to claim 5 wherein the alkali metal borohydride is added in the presence of a solvent therefor.

8. An odorless neutralized alkylaryl sulfonate detergent composition having 9 to 18 carbon atoms in the alkyl groups having incorporated therein about 0.0001 to 0.1% by weight based on the sulfonate detergent of alkali metal borohydride.

9. Composition according to claim 8 wherein the alkali metal borohydride is sodium borohydride.

References Cited
UNITED STATES PATENTS

| 22,548 | 9/1944 | Brandt | 260—505 |
|---|---|---|---|
| 2,469,378 | 5/1949 | Flett | 260—505 |

OTHER REFERENCES

Schlessinger et al.: J.A.C.S. 76 (1953), pp. 199–204.

LORRAINE A. WEINBERGER, *Primary Examiner.*

M. WEBSTER, *Assistant Examiner.*